March 15, 1955
E. L. COLE
2,704,171
MOTOR OPERATED PIPETTING MACHINE
Filed Dec. 11, 1950
4 Sheets-Sheet 1
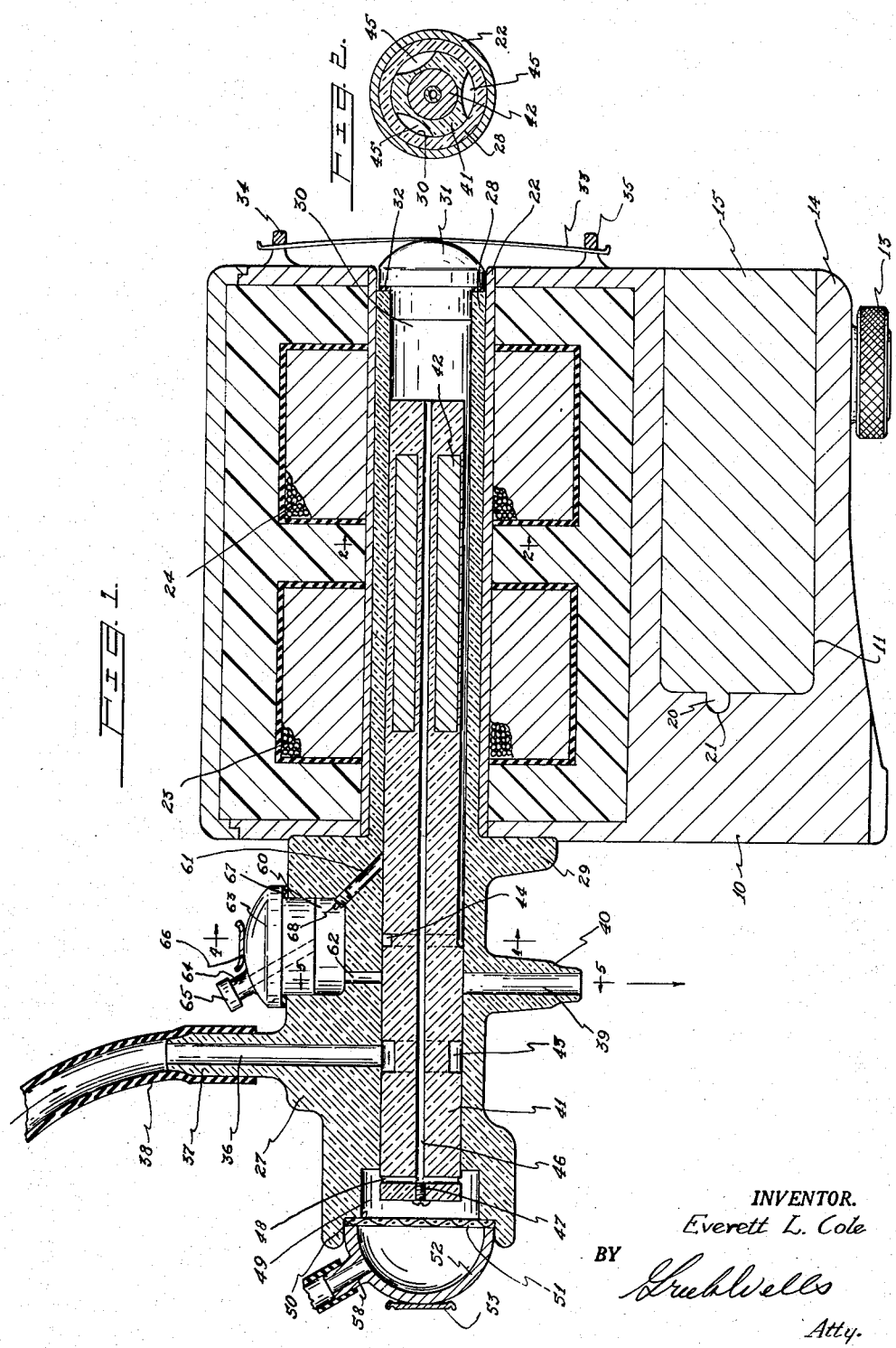
INVENTOR.
Everett L. Cole
BY
Grubb Wells
Atty.

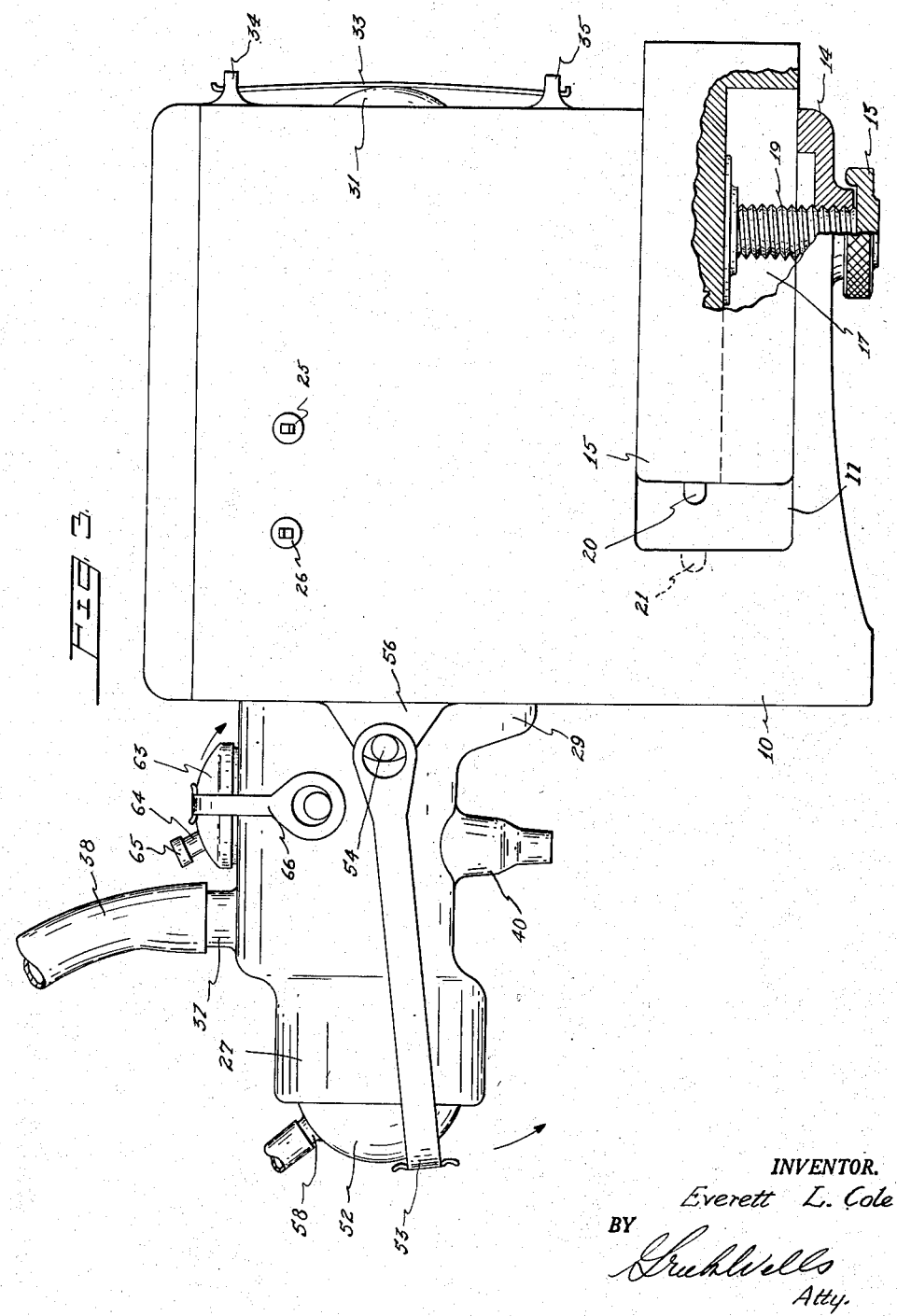

March 15, 1955　　　　　E. L. COLE　　　　　2,704,171
MOTOR OPERATED PIPETTING MACHINE
Filed Dec. 11, 1950　　　　　　　　　　　4 Sheets-Sheet 3
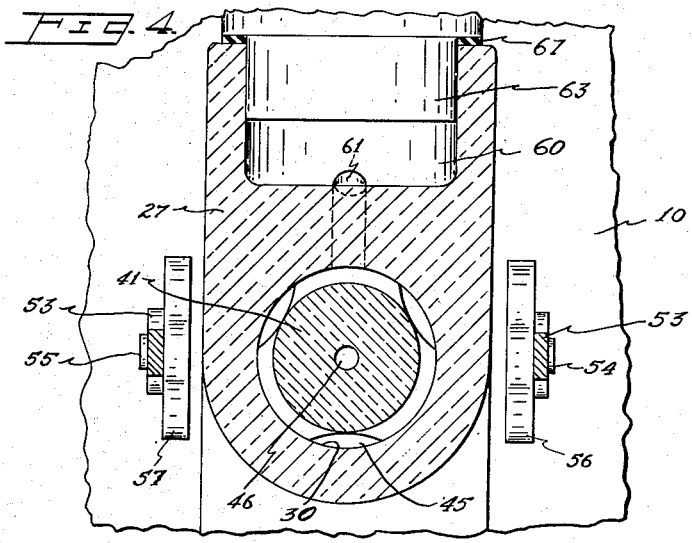
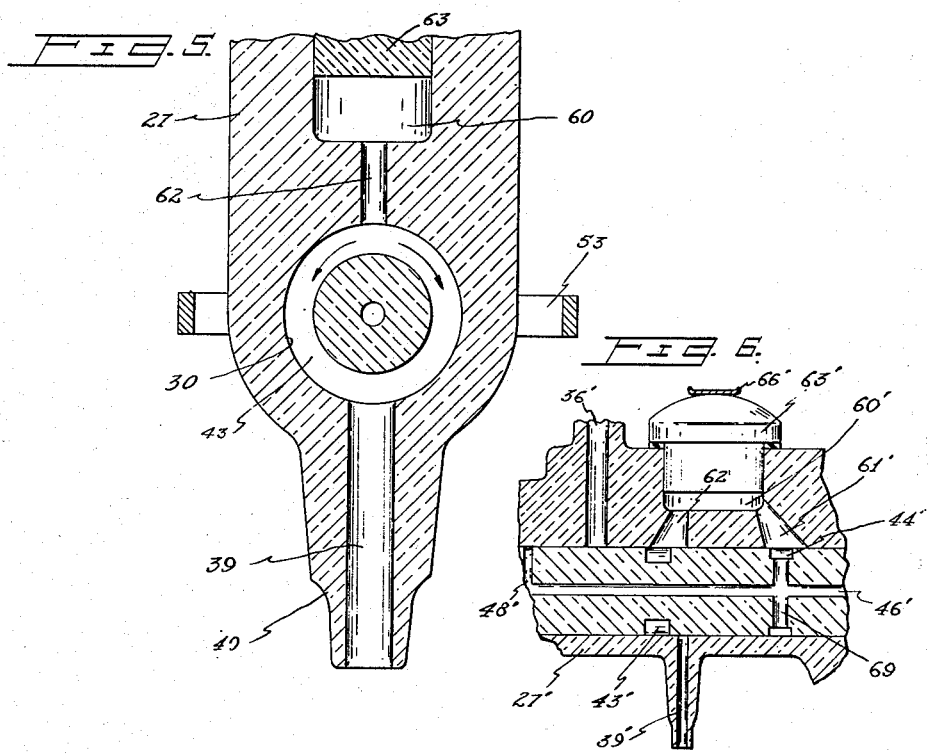
INVENTOR.
Everett L. Cole
BY
Fruk Wells
Atty.

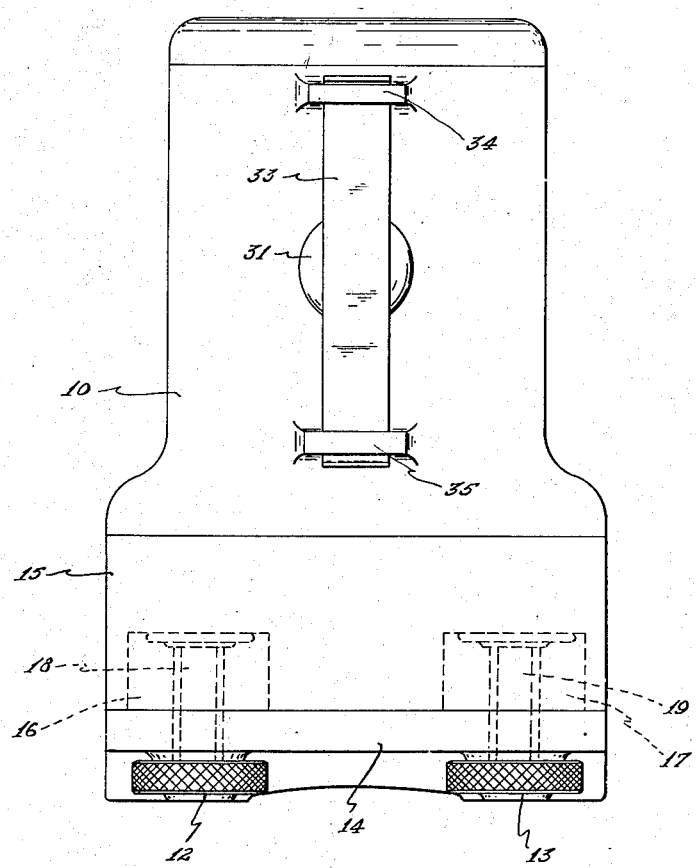

United States Patent Office 2,704,171
Patented Mar. 15, 1955

2,704,171

MOTOR OPERATED PIPETTING MACHINE

Everett L. Cole, Hamilton, Mont.

Application December 11, 1950, Serial No. 200,298

9 Claims. (Cl. 222—148)

The present invention relates to improvements in a motor operated pipetting machine.

Machines of the type to which my invention applies are used in biological laboratories and similar places to meter small quantities of various fluids such as vaccines, serum solutions etc. It is particularly desirable to have a machine that is substantially automatic where a large number of quantities of fluid must be measured. It is particularly necessary that the operating parts of the machine that may be exposed to the fluid be readily cleaned and replaced.

It is the purpose of my invention to provide a machine for metering small quantities of fluid wherein the exact quantities to be separated may be repeatedly taken from a source of supply and wherein the operating element for measuring is a single piston free of mechanical connections in order that it can be removed and replaced and the barrel for the piston can be cleaned and sterilized in an efficient and simple manner.

Other detailed objects and advantages of the invention will appear from the following description and the accompanying drawings illustrating a preferred form of the invention. It should be understood however, that the drawings and description are illustrative only and are not intended to limit the invention except insofar as it is limited by the claims.

In the drawings:

Figure 1 is a longitudinal section through a machine embodying my invention;

Figure 2 is a fragmentary sectional view taken on the line 2—2 of Figure 1;

Figure 3 is a view in side elevation of the machine;

Figure 4 is a fragmentary sectional view on the line 4—4 of Figure 1;

Figure 5 is a sectional view on the line 5—5 of Figure 1 showing the piston in a changed position;

Figure 6 is a fragmentary sectional view illustrating a slightly modified form of the invention; and Figure 7 is an end view of the machine looking at the right hand end of Figure 3.

Referring now to the drawings and particularly to Figures 1 and 3, my improved machine embodies a stand or base 10 which is so constructed as to provide for mounting upon the top of a table or for clamping to the side edge of a table if desired. To this end the base 10 has a transverse slot 11 to receive the edge of the table and has two adjustable feet 12 and 13 that are screw threaded through the lower wall portion 14 defining the slot 11. A weight member 15 is slotted as indicated at 16 and 17 to receive the upper ends of the screw threaded legs 18 and 19 that are provided for the feet 12 and 13. The weight member 15 has a rib 20 and the base 10 has a recess 21 receiving the rib 20 tightly so that the weight 15 normally need not be clamped in place.

The base 10 houses a tubular guide 22 and two solenoid coils 23 and 24 which are suitably connected to a source of current through the switches 25 and 26 illustrated on the side of the machine in Figure 3.

The operating parts of the machine are all carried by a body 27 which has a tubular extension 28 slidably fitted into the tube 22 and extending substantially the full length thereof. A shoulder 29 on the body 27 abuts the end face of the base 10 and preferably is set into the end face thereof slightly as illustrated in Figure 1. The body 27 and the extension 28 have a cylindrical bore 30 extending therethrough. The right hand end of the cylindrical bore as shown in Figure 1, is closed by a plug 31 and a sealing gasket 32. The plug 31 is held in place by a flat spring 33 that extends through upper and lower loops 34 and 35 formed on the base 10.

An inlet opening to the cylindrical bore 30 is provided at 36. A nipple 37 provides means for mounting a supply tube 38 or other means for supplying liquid to be metered. An outlet 39 is provided in the body 27 for the cylindrical bore 30. This outlet 39 is offset longitudinally of the body from the inlet 36. A nipple 40 provides means for directing the outlet liquid into a suitable container. Preferably I provide the nipples 37 and 40 with tips, as illustrated in Figure 1, adapted to fit the ordinary hypodermic needle so that the liquid may be either discharged into or taken from the machine by a hypodermic needle.

The only moving part of the machine is a piston 41 which is free to move endwise in the cylindrical bore 30. This piston, as shown, is constructed of a suitable nonmagnetic or insulating material. It carries a core 42 of iron or other magnetic material that will act as a core for the coils 23 and 24. The core 42 is positioned so as to be attracted by one or the other of said coils when they are energized. The piston 41 has a metering recess 43 formed in its surface and positioned to lie beneath the inlet 36 when the core 42 is attracted by the coil 23. The piston 41 is also provided with an annular recess 44 at a distance from the metering recess 43 and the recess 44 is opened to the right hand end of the piston through channels 45 provided in the piston by fluting its outer surface. The outlet 39 is so positioned that when the piston is moved to the right by attraction of its core 42 by the coil 24, the metering recess 43 is aligned with the outlet 39. The piston 41 has a longitudinal bore 46 extending throughout its length and closed at the left hand end by a screw 47. A cross bore 48 is provided at the left hand end of the piston.

The body 27 has an enlarged recess 49 opening to the piston and a shoulder at 50 to receive a disk 51. A hollow semi-spherical cover 52 is set over the disk 51 and is held in place by a securing yoke 53. The yoke 53 has its opposite ends pivoted on pins 54 and 55 that are formed on bosses 56 and 57 on the end of the base 10. Preferably the cover 52 is provided with an inlet connection 58 through which sterile air or gas may be admitted from a suitable source. The disk 51 serves as a filter for air or gas. Of course, when sterile air is not used in the body 27 the inlet 58 may be left open to atmosphere.

The body 27 has a recess 60 in the top thereof, this recess being connected to the bore 30 by two channels 61 and 62. The recess 60 is closed by a cap 63 which carries an inlet connection 64 that may be connected to a source of gas under pressure or closed by a suitable cap indicated at 65. A yoke 66 holds the closure 63 in place. A gasket 67 is used for sealing the closure.

It will be appreciated that the body 27 in its entirety is readily removable from the base 10 by simply dropping the spring yoke 53 down. Also, the release of the yoke 53 also makes it a simple matter to remove the cover 52 and the disk 51 to take out the piston 41. The measuring recess 43 in the piston might, of course, be made adjustable for different volumes. However, I prefer to use individual pistons for the various volumes required since it is a simple and easy matter with my machine to replace a piston at any time with one of the desired volume.

The operating cycle of the machine is substantially as follows: At the beginning the solenoid 23 is operated to make sure that the recess 43 is beneath the inlet 36. The space at the right hand end of the extension 28 will be filled with gas or air normally through the inlet 58 at the cap 52, the disk 51, the cross bore 48 and the longitudinal bore 46 of the piston. Liquid can flow into the recess 43 and fill it when the parts are in this position. Next the solenoid coil 24 is energized and this attracts the core 42 to move the piston 41 to the right. This brings the recess 43 into alignment with the outlet 39. Likewise it cuts off the air connection to the interior of the extension 28 by closing the cross bore 48. As soon as the recess 44 comes into alignment with the channel 61, the air or gas compressed within the extension 28 will flow through the recess 60 and down through the channel 62 to prevent any tendency of the liquid to hang in the recess 43 and the outlet 39. In other words, enough pressure is built up to insure clearing of the recess 43 and the outlet 39. The solenoid 23 is then energized to return piston 41 to the original position.

In some cases it is desirable to use a special gas or fluid to expel the measured fluid through the outlet 39 and this fluid can be supplied through the inlet 64 of the cap 63. In such a procedure the disk 51 may be a solid disk rather than a filter as shown, and the screw 47 can be removed to equalize pressure on both ends of the piston at all times. The passage 61 can be closed with a plug 68 if the fluid is not to be permitted to enter the passages 44, 45 and 46. However the device may be operated, supplying gas under pressure through the inlet 64 with the filter disk 51 in place. In such case the gas will serve as a means of keeping any foreign gas or air from entering and contaminating the liquid handling parts of the piston since there will be a flow on each stroke through the passage 46 out into the recess 49.

The modification in Figure 6 is essentially the same as the main form of the invention. However, the piston 41' is not fluted and communication from the passage 46' to the recess 44' is established by a transverse bore 69 in the piston. The connecting passages 61' and 62' between the recess 60' and the annular recesses 43' and 44' are elongated in the direction of piston travel at the ends opening upon the piston 41' so that gas pressure is applied on the liquid in the recess 43' before it reaches a position to discharge through the outlet 39'. The closure 63' has no gas inlet. This closure is also used in the main form of the invention when no gas connection is desired to the recess 60.

It is preferable to make the entire body 27 and the pistons 41 of materials that can be readily sterilized and kept clean. The pistons in particular and the tube 22 must be non-magnetic except for the core 42, for efficient operation. If desired the entire body 27 may be made of transparent material such as glass or plastic composition and the pistons likewise may be transparent to permit observance of the operation of the machine.

It is believed that the nature and advantages of my invention will be apparent from the foregoing description.

Having thus described my invention, I claim:

1. A machine of the character described comprising a body having a tubular passage therethrough, an inlet channel to said passage and an outlet channel from the passage formed in the body and spaced longitudinally of the passage from each other, a piston slidably fitted in said passage, the piston being shorter than the passage and having a longitudinal bore extending from one end thereof to a point adjacent to the other end thereof, and a cross bore intersecting the longitudinal bore at said other end, said piston having a metering recess therein aligning with the inlet channel when the piston is at one end of its travel and with the outlet channel when the piston is at the other end of its travel, a second recess in said piston, said piston having a channel therein connecting the second recess with the longitudinal bore in the piston, a bypass in the body having both ends closed by said piston when the first named recess is aligned with the inlet channel but positioned to establish a passage between said recesses when the first named recess is aligned with the outlet channel, the cross bore being closed by the wall of the tubular passage when the first named recess is aligned with the outlet channel, and being open when the first named recess is aligned with the inlet channel, said piston having a solenoid core embedded therein, and an electro-magnet winding surrounding a portion of the body for attracting the core to move the piston from one position to the other.

2. In a machine of the character described, a support having a passage therein, an electrical winding about a portion of said passage, a piston mounting body having a tubular part thereof extending into said passage and through said winding, said body having a completely enclosed, free piston slidable therein and extending into said tubular part and through said winding, the body and its tubular part having a bore therethrough for said piston, end closures for said bore, a yoke on the support engaging one of said end closures and securing that end closure to the body and the body to the support, a core of magnetic material positioned in said piston to be attracted by the winding to move the piston in said body, said piston having a measuring recess therein, said body having an inlet passage registerable with the recess when the core is attracted, and said body having an outlet passage spaced axially from the inlet passage registerable with the recess when the core is not attracted by said winding.

3. In a machine of the character described, a support having a passage therein, an electrical winding about a portion of said passage, a piston mounting body having a tubular part thereof extending into said passage and through said winding, said body having a completely enclosed, free piston slidable therein and extending into said tubular part and through said winding, the body and its tubular part having a bore therethrough for said piston, end closures for said bore, a yoke on the support engaging one of said end closures and securing that end closure to the body and the body to the support, a core of magnetic material positioned in said piston to be attracted by the winding to move the piston in said body, said piston having a measuring recess therein, said body having an inlet passage registerable with the recess when the core is attracted, said body having an outlet passage spaced axially from the inlet passage, and a second electrical winding about said passage operable when energized to attract said core and move the piston into position to register the recess therein with the outlet passage.

4. In a machine of the character described, a support, a piston mounting body of non-magnetic material carried by said support, said body having a piston receiving passage therein, an electrical winding surrounding a portion of the passage, a completely enclosed, free piston of non-magnetic material in said passage, end closures for said passage confining the piston within said passage, said end closures being spaced apart a distance substantially greater than the length of the free piston so the piston can reciprocate in said passage, a core of magnetic material in said piston positioned to be attracted by said winding to move the piston when the winding is energized between filling and emptying positions, longitudinally spaced inlet and outlet means to the passage, and said piston having a measuring recess adapted, in filling position of the piston, to register with the inlet means to receive a charge of liquid and, in emptying position of the piston, to register with the outlet means.

5. In a machine of the character described, a support, a piston mounting body of non-magnetic material carried by said support, said body having a piston receiving passage therein, an electrical winding surrounding a portion of the passage, a completely enclosed, free piston of non-magnetic material in said passage, end closures for said passage confining the piston within said passage, said end closures being spaced apart a distance substantially greater than the length of the free piston so the piston can reciprocate in said passage, a core of magnetic material in said piston positioned to be attracted by said winding to move the piston when the winding is energized between filling and emptying positions, longitudinally spaced inlet and outlet means to the passage, and said piston having a measuring recess adapted, in filling position of the piston, to register with the inlet means to receive a charge of liquid and, in emptying position of the piston, to register with the outlet means, and means in said body separated from the outlet and the inlet passages by said piston to supply gas into said recess when it is registered with the outlet means.

6. In a machine of the character described, a support having a passage therein, an electrical winding about a portion of said passage, a piston mounting body having a tubular part thereof extending into said passage and through said winding, said body having a completely enclosed, free piston slidable therein and extending into said tubular part and through said winding, the body and the tubular part having a continuous bore therethrough for said piston, end closures for said bore, one end closure including a screen and a gas inlet, a core of magnetic material positioned in said piston to be attracted by the winding to move the piston in said body, said piston having a measuring recess therein, said body having an inlet passage registerable with the recess when the core is attracted, said body having an outlet passage spaced axially from the inlet passage, a second electrical winding about said passage operable when energized to attract said core and move the piston into position to register the recess therein with the outlet passage, and means in said body separated from the outlet and the inlet passages by said piston to supply gas into said recess when it is registered with the outlet passage.

7. In a machine of the character described, a body having a piston receiving bore, a piston therein, said body having an inlet channel extending downwardly from the exterior thereof into said bore, and an outlet channel extending downwardly from the bore to the exterior thereof, the inlet and outlet channels being spaced apart axially of said bore, said piston having a measuring recess therein registering with the inlet channel in one position of the piston and registering with the outlet channel in another position of the piston, means to move the piston from one of said positions to the other, gas inlet means at one end of the bore, said piston having a gas passage therein open to said gas inlet means when the recess in the piston registers with the inlet channel and cut off from the gas inlet means when the piston moves away from the first named position, and cooperating channels in the body and the piston connecting the gas passage in the piston to said recess when the recess registers with the outlet channel.

8. In a machine of the character described, a support, a piston mounting body of non-magnetic material carried by said support, said body having a piston receiving passage therein, an electrical winding surrounding a portion of the passage, a completely enclosed, free piston of non-magnetic material in said passage, a core of magnetic material in said piston positioned to be attracted by said winding to move the piston when the winding is energized between filling and emptying positions, longitudinally spaced inlet and outlet means to the passage, and said piston having a measuring recess adapted, in filling position of the piston, to register with the inlet means to receive a charge of liquid and, in emptying position of the piston, to register with the outlet means, the body having a gas chamber therein provided with an outlet positioned to align with the measuring recess in the piston when said measuring recess is registered with the outlet means, a gas inlet to the piston receiving passage at one end of said body, a longitudinal bore in said piston, a cross bore intersecting the longitudinal bore in the piston adjacent to said end of the body and open to the gas inlet only when the measuring recess is registered with the inlet means, and said piston and body having passages therein positioned to conduct gas from said longitudinal bore into the chamber when the measuring recess is aligned with the outlet means.

9. In a machine of the character described, a support, a piston mounting body of non-magnetic material carried by said support, said body having a piston receiving passage therein, an electrical winding surrounding a portion of the passage, a completely enclosed, free piston of non-magnetic material in said passage, a core of magnetic material in said piston positioned to be attracted by said winding to move the piston when the winding is energized between filling and emptying positions, longitudinally spaced inlet and outlet means to the passage, and said piston having a measuring recess adapted, in filling position of the piston, to register with the inlet means to receive a charge of liquid and, in emptying position of the piston, to register with the outlet means, closures for the ends of said piston receiving passage, one of said closures having a gas inlet, and cooperating conduits in the piston and body operable to deliver gas entering the passage from said gas inlet to the measuring recess, when the measuring recess is aligned with the outlet passage.

References Cited in the file of this patent

UNITED STATES PATENTS

| | | |
|---|---|---|
| 1,075,898 | Champ et al. | Oct. 14, 1913 |
| 1,528,022 | Keiser | Mar. 3, 1925 |
| 1,663,590 | Gourdon | Mar. 27, 1928 |